(12) United States Patent
Hung et al.

(10) Patent No.: US 7,438,880 B2
(45) Date of Patent: Oct. 21, 2008

(54) PRODUCTION OF HIGH PURITY ULTRAFINE METAL CARBIDE PARTICLES

(75) Inventors: Cheng-Hung Hung, Wexford, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/613,551

(22) Filed: Dec. 20, 2006

(65) Prior Publication Data

US 2008/0148905 A1     Jun. 26, 2008

(51) Int. Cl.
*C01B 3/30* (2006.01)
*C01B 31/34* (2006.01)
*C01B 31/36* (2006.01)

(52) U.S. Cl. ............... 423/291; 422/186; 423/345; 423/439; 423/440

(58) Field of Classification Search ............ 423/291, 423/440, 441, 345, 439; 422/186
See application file for complete search history.

(56) References Cited

U.S. PATENT DOCUMENTS

| | | | |
|---|---|---|---|
| 3,340,020 A * | 9/1967 | Neuenschwander et al | 423/252 |
| 4,460,697 A * | 7/1984 | Hara et al. | 501/87 |
| 4,851,262 A | 7/1989 | McFeaters | |
| 5,194,128 A * | 3/1993 | Beaty et al. | 204/164 |
| 5,302,366 A * | 4/1994 | Schuette et al. | 423/346 |
| 5,486,675 A | 1/1996 | Taylor et al. | |
| 5,749,937 A | 5/1998 | Detering et al. | |
| 5,788,738 A | 8/1998 | Pirzada et al. | |
| 5,851,507 A | 12/1998 | Pirzada et al. | |
| 5,935,293 A | 8/1999 | Detering et al. | |
| 5,948,379 A * | 9/1999 | Konig et al. | 423/411 |
| 5,984,997 A | 11/1999 | Bickmore et al. | |
| 5,989,648 A | 11/1999 | Phillips | |
| 6,228,904 B1 | 5/2001 | Yadav et al. | |
| 6,254,940 B1 * | 7/2001 | Pratsinis et al. | 427/562 |
| RE37,853 E | 9/2002 | Detering et al. | |
| 6,652,967 B2 | 11/2003 | Yadav et al. | |
| 6,669,823 B1 | 12/2003 | Sarkas et al. | |
| 6,689,192 B1 | 2/2004 | Phillips et al. | |
| 6,716,525 B1 | 4/2004 | Yadav et al. | |
| 6,719,821 B2 | 4/2004 | Yadav et al. | |
| 6,786,950 B2 | 9/2004 | Yadav et al. | |

(Continued)

FOREIGN PATENT DOCUMENTS

CZ         296678      *    5/2006

(Continued)

OTHER PUBLICATIONS

Taylor, "The surface composition of silicon carbide powders and whiskers: An XPS study", J. Mater. Res., Jan./Feb. 1989, pp. 189-203, vol. 4, No. 1, no month.

(Continued)

*Primary Examiner*—Wayne Langel
(74) *Attorney, Agent, or Firm*—Donald R. Palladino

(57) ABSTRACT

The production of ultrafine metal carbide powders from solid metal carbide and nitrogen-containing material is disclosed. The starting materials are fed together or separately to a plasma system where the solid metal carbide is melted and/or vaporized in the presence of nitrogen to form ultrafine metal carbide particles of high purity.

22 Claims, 3 Drawing Sheets

U.S. PATENT DOCUMENTS

| | | | |
|---|---|---|---|
| 6,821,500 B2 | 11/2004 | Fincke et al. | |
| 6,830,822 B2 | 12/2004 | Yadav | |
| 6,849,109 B2 | 2/2005 | Yadav et al. | |
| 7,232,556 B2 * | 6/2007 | Yadav | 423/592.1 |
| 7,238,219 B2 * | 7/2007 | Xiao et al. | 75/252 |
| 2005/0158229 A1 * | 7/2005 | Dobbs | 423/440 |
| 2006/0057050 A1 * | 3/2006 | Ren et al. | 423/291 |

FOREIGN PATENT DOCUMENTS

| | | |
|---|---|---|
| JP | 63-170212 | 7/1988 |
| JP | 1-290565 | 11/1989 |

OTHER PUBLICATIONS

Allaire et al., "Factors influencing the crystallization of ultrafine plasma-synthesized silicon nitride as a single powder and in composite SiC-Si3N4 powder", J. Mat. Sci., 1992, pp. 1265-1270, vol. 27, no month.

Tartaj et al., "Electrokinetic Behavior and Stability of Silicon Carbide Nanoparticulate Dispersions", J. Am. Ceram. Soc., 1998, pp. 389-394, vol. 81, No. 2, no month.

* cited by examiner

PRODUCTION OF HIGH PURITY ULTRAFINE METAL CARBIDE PARTICLES

GOVERNMENT CONTRACT

This invention was made with United States government support under Contract Number W911NF-05-9-0001 awarded by DARPA. The United States government has certain rights in this invention.

FIELD OF THE INVENTION

The present invention relates to ultrafine metal carbide particles, and more particularly relates to the production of highly pure ultrafine metal carbide particles utilizing solid metal carbide and nitrogen-containing feed materials.

BACKGROUND INFORMATION

Micron-sized boron carbide particles have been produced by solid phase synthesis using $B_2O_3$ and carbon as the starting reactant materials.

Boron carbide particles have also been produced by vapor phase synthesis using $BCl_3$ and $CH_4$ gaseous reactants as the starting materials. Although such vapor phase synthesis is capable of producing $B_4C$ nanoparticles, the process is relatively expensive.

SUMMARY OF THE INVENTION

In certain respects, the present invention is directed to a method for making ultrafine metal carbide particles comprising: introducing a solid metal carbide and a nitrogen-containing material into a plasma; heating the solid metal carbide and nitrogen-containing material by the plasma to form ultrafine particles of the metal carbide; and collecting the ultrafine metal carbide particles.

In other respects, the present invention is directed to an apparatus for making ultrafine metal carbide particles comprising: a source of solid metal carbide; a source of nitrogen-containing material; a plasma chamber; and at least one feed line for delivering the solid metal carbide and the nitrogen-containing material to the plasma chamber.

In further respects, the present invention is directed to ultrafine metal carbide particles made from such methods and apparatus.

DETAILED DESCRIPTION

Figure 1:
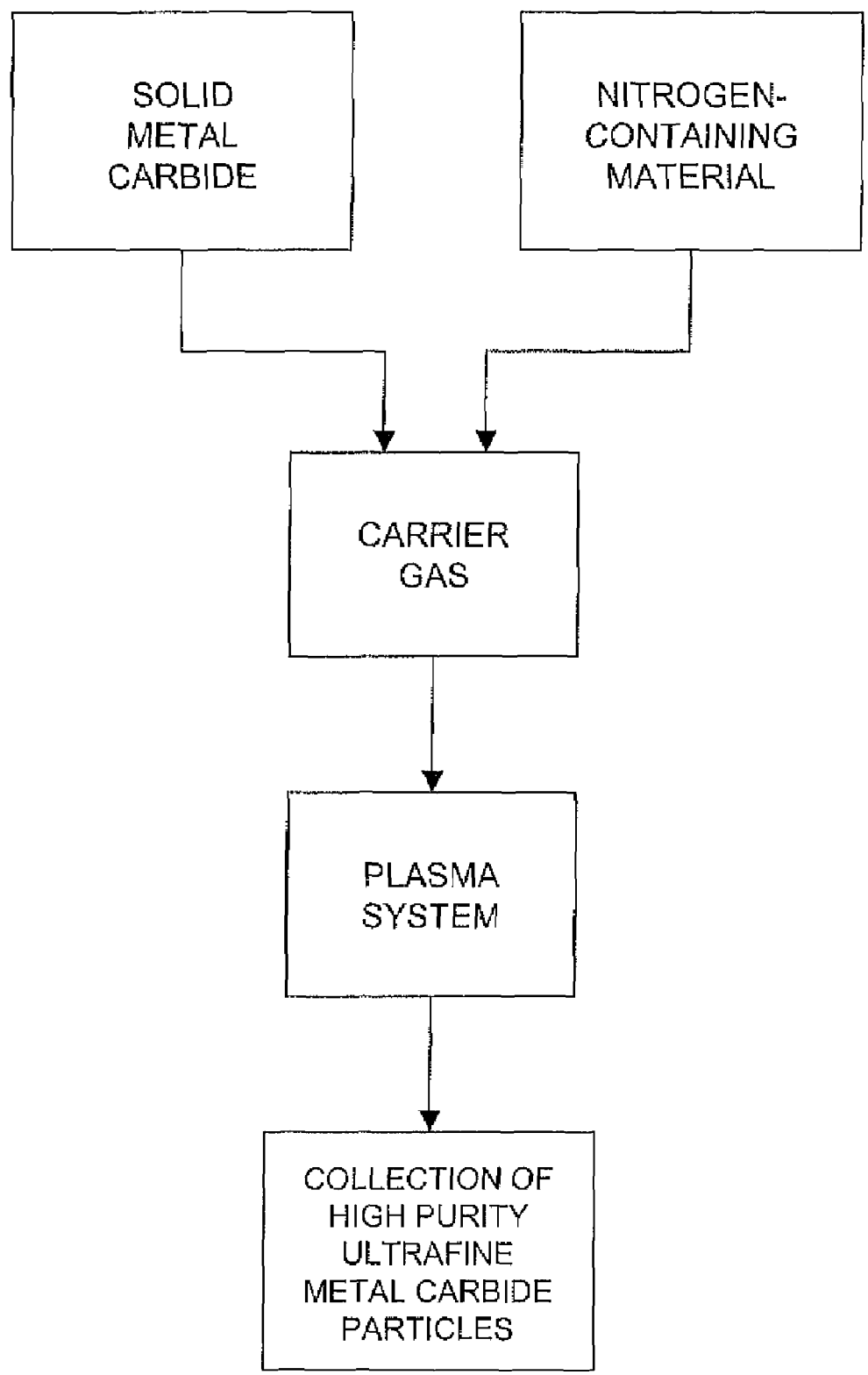
FIG. 1 is a flowchart depicting the steps of certain methods of the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to methods and/or apparatus for making ultrafine metal carbide particles, as well as the ultrafine metal carbide particles produced by such methods and apparatus. Examples of ultrafine metal carbides that may be produced include boron carbide, tungsten carbide, titanium carbide, silicon carbide, aluminum carbide, iron carbide, zirconium carbide and the like. Boron carbide ultrafine particles include $B_4C$, $B_{13}C_2$, $B_8C$, $B_{10}C$, $B_{25}C$ and any other boron carbides that may be produced as ultrafine particles utilizing solid boron carbide and nitrogen-containing starting materials.

As used herein, the term "ultrafine metal carbide particles" refers to metal carbide particles having a B.E.T. specific surface area of at least 5 square meters per gram, such as 20 to 200 square meters per gram, or, in some cases, 30 to 100 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the ultrafine metal carbide particles made in accordance with the present invention have a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation:

$$\text{Diameter (nanometers)} = 6000/[BET(m^2/g)*\rho(grams/cm^3)]$$

In certain embodiments, the ultrafine metal carbide particles have an average particle size of no more than 100 nanometers, in some cases, no more than 50 nanometers or, in yet other cases, no more than 30 or 40 nanometers. As used herein, the term "average particle size" refers to a particle size as determined by visually examining a micrograph of a transmission electron microscopy ("TEM") image, measuring the diameter of the particles in the image, and calculating the average particle size of the measured particles based on magnification of the TEM image. One of ordinary skill in the art will understand how to prepare such a TEM image and determine the average particle size based on the magnification. The size of a particle refers to the smallest diameter sphere that will completely enclose the individual particle.

FIG. 1 is a flow diagram depicting certain embodiments of the present invention. Solid metal carbide and nitrogen-containing material are provided as feed materials. The metal carbide is provided in powder form, while the nitrogen-containing material may be provided in solid form, e.g., as a powder, or may be provided in liquid or gaseous form. In the embodiment shown in FIG. 1, the feed materials are provided from separate sources. However, a single mixture of the solid metal carbide and nitrogen-containing material may also be used.

As shown in FIG. 1, in accordance with certain methods of the present invention, the feed material powders are contacted with a carrier gas. The carrier may be a gas that acts to suspend or atomize the feed materials in the gas, thereby producing a gas-stream in which the solid feed materials are entrained. Suitable carrier gases include, but are not limited to, argon, helium, nitrogen, hydrogen, or a combination thereof.

Next, in accordance with certain embodiments of the present invention, the feed materials are heated by a plasma system, e.g., as the materials flow into a plasma chamber, yielding a gaseous stream of the feed materials and/or their vaporized or thermal decomposition products and/or their reaction products. In certain embodiments, the feed materials are heated to a temperature ranging from 1,500° to 20,000° C., such as 1,700° to 8,000° C.

As is seen in FIG. 1, after the ultrafine metal carbide particles exit the plasma system, they are collected. Any suitable means may be used to separate the ultrafine metal carbide particles from the gas flow, such as, for example, a bag filter, cyclone separator or deposition on a substrate.

In accordance with certain embodiments of the present invention, the metal carbide feed material powder has an average particle diameter of from 0.1 micron to 10 millimeters, for example, from 0.2 micron (D10%) to 2.5 microns (D90%). As a particular example, boron carbide powder such as HD-15 commercially available from H. C. Strack (a Bayer Materials Science Company) having a B.E.T. specific surface area of 15 m$^2$/g may be used.

In accordance with certain embodiments of the present invention, the nitrogen-containing feed materials may comprise urea, ureaform, urazole, ammonium acetate, N-N-dimethylformamide, methylformamide, methylhydrazine, formamide, ethylenediamine, methylamine and/or ammonia. The nitrogen-containing feed material may be provided as a solid, liquid or gas. When urea is used as the nitrogen-containing feed material, it may have an average particle size of from 10 to 1,000 microns, e.g., from 100 microns (D10%) to 700 microns (D90%). For example, commercially available urea from Alfa Aesar, a Johnson Mathey company, may be used.

Oxygen impurities may be unavoidably introduced into the plasma system from several sources. For example, the metal carbide starting powders may include oxide impurities. Furthermore, plasma processing gases such as argon may contain oxygen impurities, and the plasma vacuum system may allow minor amounts of air into the system due to minor leaks or constraints of the vacuum system. Furthermore, during or after plasma processing, back reactions may occur in which oxides are reformed in the produced ultrafine particles.

Although not intending to be bound by any particular theory, the provision of nitrogen-containing feed material may reduce or eliminate oxide impurities in the ultrafine metal carbide particles by various mechanisms. The use of a nitrogen-containing feed material provides a source of nitrogen in the plasma system which may preferentially react with oxygen to form $NO_x$ reaction products that are driven off as gaseous waste products during the plasma process. The presence of nitrogen during the plasma process may also form a thin layer of boron nitride on the surface of the ultrafine carbide particles which is oxidation resistant. The nitrogen supplied from the nitrogen-containing feed material may thus form a protective layer, may scavenge oxygen during the plasma process, or may reduce oxide impurities by other mechanisms.

As used herein, the term "high purity", when referring to the produced ultrafine metal carbide particles, means that the particles have significantly reduced impurity levels below the impurity levels obtained in the absence of a nitrogen-containing feed material. For example, oxide impurity levels in ultrafine $B_4C$ particles produced in accordance with the present invention may be below 5 wt. %, or below 1 wt. %

In certain embodiments, the solid metal carbide and nitrogen-containing material may be contacted with other reactants or dopants, such as SiC or other silicone-containing compounds, elemental metals such as B, polymers, alkoxy metal compounds, metal carboxylates, hydrogen and/or polypropylene, that may be injected into the plasma chamber or which may be introduced as part of the feed materials. For example, the additional reactants may be used to further increase the purity and/or yield of metal carbides such as $B_4C$, e.g., by reducing carbothermal reactions which would otherwise tend to form $B_2O_3$ and graphite. Furthermore, the additional reactants may result in improved physical properties of the $B_4C$ such as mechanical properties and the like. The additional reactants may result in the formation of additional compounds. For example, silicon carbide or silicon-containing materials such as silanes may be used to produce ultrafine silicon carbide particles in addition to the ultrafine metal carbide particles while reducing carbon impurity levels in the metal carbide particles.

In certain methods of the present invention, after the gaseous stream is produced, it is contacted with one or more quench streams that are injected into the plasma chamber through at least one quench stream injection port. For example, the quench streams are injected at flow rates and injection angles that result in impingement of the quench streams with each other within the gaseous stream. The material used in the quench streams is not limited, so long as it adequately cools the gaseous stream to facilitate the formation or control the particle size of the ultrafine boron carbide particles. Materials suitable for use in the quench streams include, but are not limited to, gases such as argon, helium, nitrogen, hydrogen gas, ammonia, mono, di and polybasic alcohols, hydrocarbons, amines and/or carboxylic acids.

In certain embodiments, the particular flow rates and injection angles of the various quench streams may vary, so long as they impinge with each other within the gaseous stream to result in the rapid cooling of the gaseous stream. For example, the quench streams may primarily cool the gaseous stream through dilution, rather than adiabatic expansion, thereby causing a rapid quenching of the gaseous stream, before, during and/or after the formation of the ultrafine metal carbide particles prior to passing the particles into and through a converging member, such as a converging-diverging nozzle, as described below.

In certain embodiments of the invention, after contacting the gaseous product stream with the quench streams to cause production of ultrafine metal particles, the ultrafine particles may be passed through a converging member, wherein the plasma system is designed to minimize the fouling thereof. In certain embodiments, the converging member comprises a converging-diverging (De Laval) nozzle. In these embodiments, while the converging-diverging nozzle may act to cool the product stream to some degree, the quench streams perform much of the cooling so that a substantial amount of the ultrafine metal carbide particles are formed upstream of the nozzle. In these embodiments, the converging-diverging nozzle may primarily act as a choke position that permits operation of the reactor at higher pressures, thereby increasing the residence time of the materials therein. The combination of quench stream dilution cooling with a converging-diverging nozzle appears to provide a commercially viable method of producing ultrafine metal carbide particles since, for example, in certain embodiments the feed materials can be used effectively without the necessity of heating the feed materials to a liquid or gaseous state before injection into the plasma.

Figure 2:
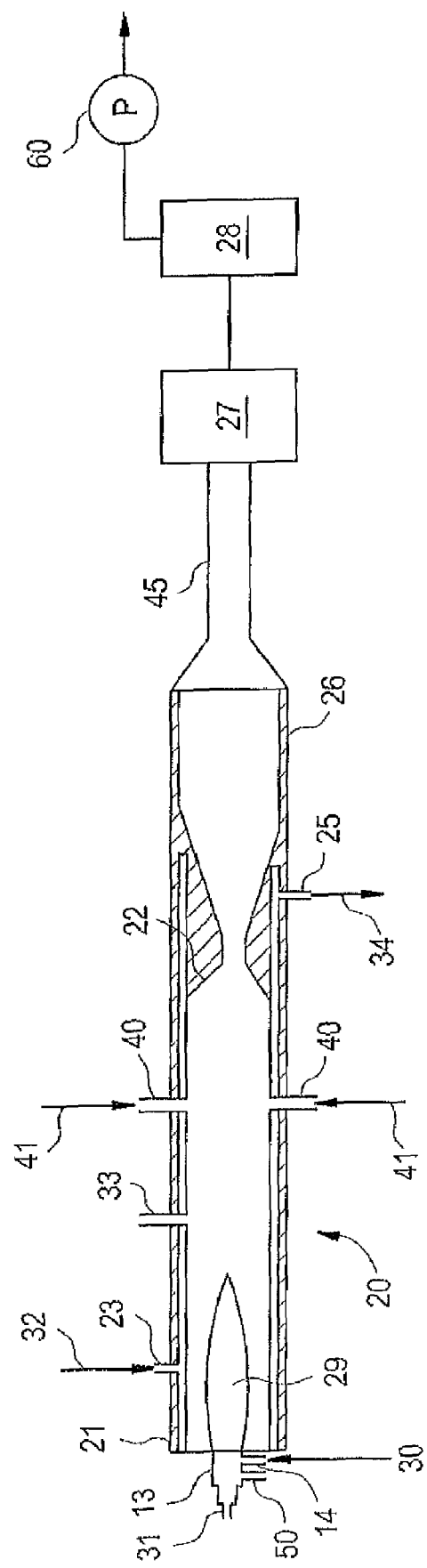
FIG. 2 is a partially schematic sectional view of an apparatus for producing ultrafine boron carbide particles including a feed line for solid metal carbide and nitrogen-containing material powders entrained in a carrier gas in accordance with certain embodiments of the present invention.

FIG. 2 is a partially schematic sectional diagram of an apparatus for producing ultrafine metal carbide particles in accordance with certain embodiments of the present invention. A plasma chamber 20 is provided that includes a feed inlet 50 which, in the embodiment shown in FIG. 2, is used to introduce a mixture of solid metal carbide and nitrogen-containing material into the plasma chamber 20. In another embodiment, the feed inlet 50 may be replaced with separate inlets (not shown) for the solid metal carbide and nitrogen-containing material. Also provided is at least one carrier gas feed inlet 14, through which a carrier gas flows in the direction of arrow 30 into the plasma chamber 20. The carrier gas may act to suspend the feed materials in the gas, thereby producing a gas-stream with the entrained feed materials which flows towards plasma 29. Numerals 23 and 25 designate cooling inlet and outlet respectively, which may be present for a double-walled plasma chamber 20. In these embodiments, coolant flow is indicated by arrows 32 and 34.

In the embodiment depicted by FIG. 2, a plasma torch 21 is provided. The torch 21 may melt and/or vaporize the solid metal carbide and nitrogen-containing material within or near the plasma 29 as the stream is delivered through the inlet of the plasma chamber 20, thereby producing a gaseous stream. As is seen in FIG. 2, the feed materials are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas by resistive and radiative heating to very high temperatures within microseconds of passing through the arc. The plasma is often luminous at temperatures above 9,000 K.

A plasma can be produced with any of a variety of gases. This can give excellent control over any chemical reactions taking place in the plasma as the gas may be inert, such as argon, helium, or neon, reductive, such as hydrogen, methane, ammonia, and carbon monoxide, or oxidative, such as oxygen, nitrogen, and carbon dioxide. Inert or reductive gas mixtures may be used to produce ultrafine metal carbide particles in accordance with the present invention. In FIG. 2, the plasma gas feed inlet is depicted at 31.

As the gaseous product stream exits the plasma 29 it proceeds towards the outlet of the plasma chamber 20. An additional reactant, as described earlier, can optionally be injected into the reaction chamber prior to the injection of the quench streams. A supply inlet for the additional reactant is shown in FIG. 2 at 33.

As is seen in FIG. 2, in certain embodiments of the present invention, the gaseous stream is contacted with a plurality of quench streams which enter the plasma chamber 20 in the direction of arrows 41 through a plurality of quench stream injection ports 40 located along the circumference of the plasma chamber 20. As previously indicated, the particular flow rate and injection angle of the quench streams is not limited so long as they result in impingement of the quench streams 41 with each other within the gaseous stream, in some cases at or near the center of the gaseous stream, to result in the rapid cooling of the gaseous stream to control the particle size of the ultrafine metal carbide particles. This may result in a quenching of the gaseous stream through dilution.

In certain methods of the present invention, contacting the gaseous stream with the quench streams may result in the formation and/or control of the particle size of the ultrafine metal carbide particles, which are then passed into and through a converging member. As used herein, the term "converging member" refers to a device that restricts passage of a flow therethrough, thereby controlling the residence time of the flow in the plasma chamber due to pressure differential upstream and downstream of the converging member.

In certain embodiments, the converging member comprises a converging-diverging (De Laval) nozzle, such as that depicted in FIG. 2, which is positioned within the outlet of the plasma chamber 20. The converging or upstream section of the nozzle, i.e., the converging member, restricts gas passage and controls the residence time of the materials within the plasma chamber 20. It is believed that the contraction that occurs in the cross sectional size of the stream as it passes through the converging portion of nozzle 22 changes the motion of at least some of the flow from random directions, including rotational and vibrational motions, to a straight line motion parallel to the plasma chamber axis. In certain embodiments, the dimensions of the plasma chamber 20 and the material flow are selected to achieve sonic velocity within the restricted nozzle throat.

As the confined stream of flow enters the diverging or downstream portion of the nozzle 22, it is subjected to an ultra fast decrease in pressure as a result of a gradual increase in volume along the conical walls of the nozzle exit. By proper selection of nozzle dimensions, the plasma chamber 20 can be operated at atmospheric pressure, or slightly less than atmospheric pressure, or, in some cases, at a pressurized condition, to achieve the desired residence time, while the chamber 26 downstream of the nozzle 22 is maintained at a vacuum pressure by operation of a vacuum producing device, such as a vacuum pump 60. Following passage through nozzle 22, the ultrafine metal carbide particles may then enter a cool down chamber 26.

Although the nozzle shown in FIG. 2 includes a converging portion and a downstream diverging portion, other nozzle configurations may be used. For example, the downstream diverging portion may be replaced with a straight portion. Quench streams may be introduced at or near the transition from the converging portion to the straight portion.

As is apparent from FIG. 2, in certain embodiments of the present invention, the ultrafine metal carbide particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

In certain embodiments, the residence times for materials within the plasma chamber 20 are on the order of milliseconds. The solid metal carbide and nitrogen-containing material entrained in the carrier gas may be injected under pressure (such as from 1 to 300 psi) through a small orifice to achieve sufficient velocity to penetrate and mix with the plasma. In addition, in many cases the injected stream is injected normal (90° angle) to the flow of the plasma gases. In some cases, positive or negative deviations from the 90° angle by as much as 30° may be desired.

The high temperature of the plasma may rapidly melt, vaporize and/or decompose the solid metal carbide and nitrogen-containing material. There can be a substantial difference in temperature gradients and gaseous flow patterns along the length of the plasma chamber 20. It is believed that, at the plasma arc inlet, flow is turbulent and there is a high temperature gradient from temperatures of about 20,000 K at the axis of the chamber to about 375 K at the chamber walls. At the nozzle throat, it is believed, the flow is laminar and there is a very low temperature gradient across its restricted open area.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures. This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that the materials have sufficient residence time at the high temperature to reach an equilibrium state and complete the formation of the desired end products.

The inside diameter of the plasma chamber 20 may be determined by the fluid properties of the plasma and moving gaseous stream. It should be sufficiently great to permit necessary gaseous flow, but not so large that recirculating eddys or stagnant zones are formed along the walls of the chamber. Such detrimental flow patterns can cool the gases prematurely and precipitate unwanted products. In many cases, the inside diameter of the plasma chamber 20 is more than 100% of the plasma diameter at the inlet end of the plasma chamber.

In certain embodiments, the converging section of the nozzle has a high aspect ratio change in diameter that maintains smooth transitions to a first steep angle (such as >45°) and then to lesser angles (such as <45° degree.) leading into the nozzle throat. The purpose of the nozzle throat is often to compress the gases and achieve sonic velocities in the flow. The velocities achieved in the nozzle throat and in the downstream diverging section of the nozzle are controlled by the pressure differential between the plasma chamber and the section downstream of the diverging section of the nozzle. Negative pressure can be applied downstream or positive pressure applied upstream for this purpose. A converging-diverging nozzle of the type suitable for use in the present invention is described in U.S. Pat. No. RE37,853 at col. 9, line 65 to col. 11, line 32, the cited portion of which being incorporated by reference herein.

The following examples are intended to illustrate certain embodiments of the present invention, and are not intended to limit the scope of the invention.

EXAMPLE 1

Ultrafine particles from boron carbide precursor powders were prepared using a DC thermal plasma reactor system of the type described in U.S. Pat. No. RE37,853 E. The main reactor system included a DC plasma torch (Model SG-100 Plasma Spray Gun commercially available from Praxair Technology, Inc., Danbury, Conn.) operated with 60 standard liters per minute of argon carrier gas and 27 kilowatts of power delivered to the torch. Boron carbide solid reactant (HD-15 grade, available from H. C. Starck—a Bayer Materials Science Company) was fed to the reactor at a rate of 1 gram per minute through a gas assisted powder feeder (Model 1264, commercially available from Praxair Technology, Inc., Danbury, Conn.) located at the plasma torch outlet. At the powder feeder, about 8.3 standard liters per minute argon were used as carrier gas. Argon gas at 5 standard liters per minute was delivered through two ⅛ inch diameter nozzles located 180° apart at 0.69 inch downstream of the powder injector port. Following a 9.7 inch long reactor section, a quench system was provided that included a quench gas injection port that included 6⅛ inch diameter nozzles located 60° apart radially and a 7 millimeter diameter converging-diverging nozzle located 3 inches downstream of the quench gas injection port. Quench air was injected at the quench gas injection port at a rate of 10 standard liters per minute. The measured B.E.T. specific surface area for the produced material was 51 square meters per gram using a Gemini model 2360 analyzer (available from Micromeritics Instrument Corp., Norcross, Ga.), and the calculated equivalent spherical diameter was 47 nanometers.

Figure 3:
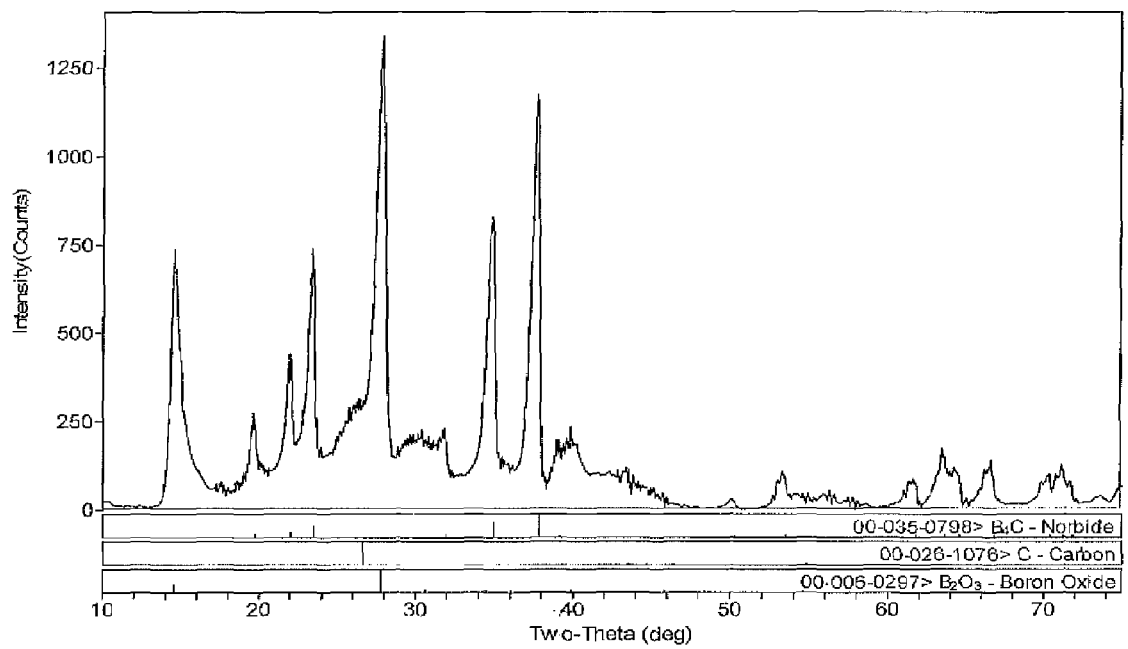
FIG. 3 is an X-ray diffraction pattern of ultrafine boron carbide particles produced with a plasma system without the use of a nitrogen-containing feed material, demonstrating that significant amounts of boron oxide and graphite are present in the sample in addition to the boron carbide.

FIG. 3 is an X-ray diffraction spectrum of the particles produced in Example 1 measured using a X-ray diffractometer (Philips X' Pert MPD model). The analysis indicated that the powder comprised crystalline boron carbide, boron oxide and graphite. The quantity of crystalline boron carbide was characterized using the main diffraction peak at <021> plane, i.e., 37.8 degree two theta. The quantity of crystalline boron oxide was characterized using the main diffraction peak at <310> plane, i.e., 27.8 degree two theta. The boron oxide concentration was calculated from the areas under the diffraction peaks with response factors assuming to be the same between boron oxide and boron carbide. Using the assumptions above, the calculated boron oxide/boron carbide ratio is 1.28 (or 56 wt. % boron oxide and 44 wt. % boron carbide).

EXAMPLE 2

Ultrafine particles were prepared using the same apparatus and operating conditions as in Example 1, except the plasma was operated with 100 standard liters per minute of argon carrier gas and power is 26 kilowatts of power delivered to the torch. Also, urea was added to the boron carbide starting powder as shown in Table 1.

TABLE 1

| Materials | Amount (grams) |
|---|---|
| HD-15 boron carbide[1] | 100 |
| Urea[2] | 17.28 |

[1]Commercially available from H.C. Starck - a Bayer Materials Science Company.
[2]Commercially available from Alfa Aesar, Ward Hill, Massachusetts.

The measured B.E.T. specific surface area for the produced material was 72 square meters per gram using a Gemini model 2360 analyzer (available from Micromeritics Instrument Corp., Norcross, Ga.), and the calculated equivalent spherical diameter was 33 nanometers.

Figure 4:
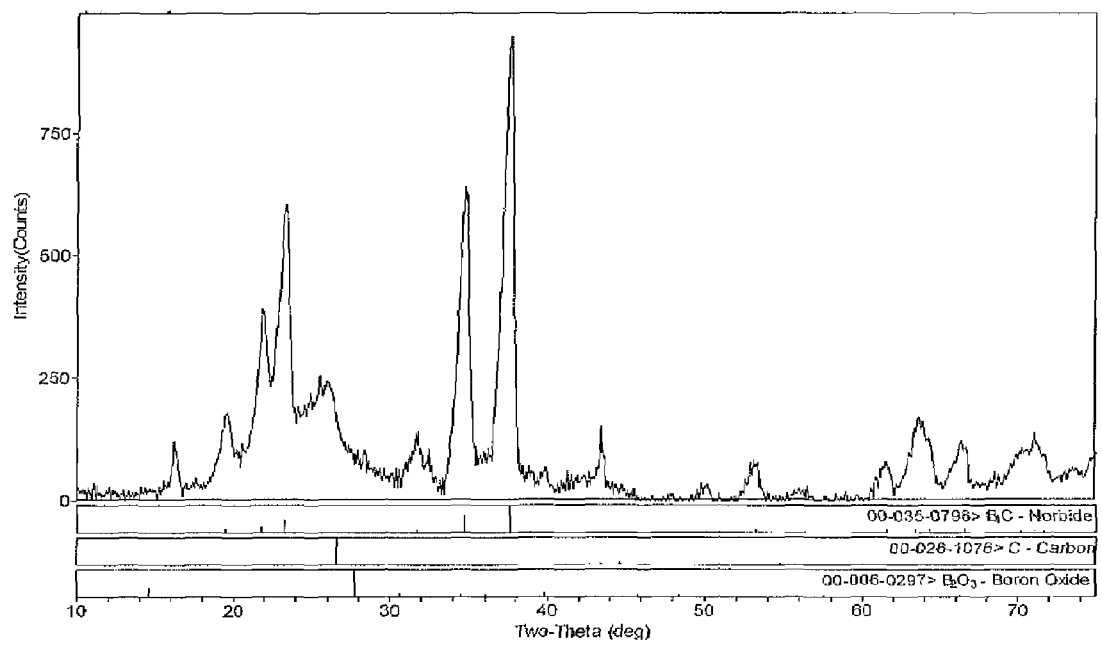
FIG. 4 is an X-ray diffraction pattern of ultrafine boron carbide particles produced with a plasma system including the use of a nitrogen-containing feed material in accordance with an embodiment of the present invention. The presence of boron oxide in the sample is significantly reduced in comparison with the sample of FIG. 3.

FIG. 4 is a X-ray diffraction spectrum of the produced particles measured using a X-ray diffractometer (Philips X' Pert MPD model). The analysis indicated that the powder comprised with crystalline boron carbide, boron oxide, and graphite. The quantity of crystalline boron carbide was characterized using the main diffraction peak at <021> plane, i.e., 37.8 degree two theta. The quantity of crystalline boron oxide was characterized using the main diffraction peak at <310> plane, i.e., 27.8 degree two theta. The boron oxide concentration was calculated from the areas under the diffraction peaks with response factors assuming to be the same between boron oxide and boron carbide. Using the assumptions above, the calculated boron oxide/boron carbide ratio is 0.009 (or 0.9 wt. % boron oxide and 99.1 wt. % boron carbide).

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method for making ultrafine metal carbide particles comprising:
   introducing a solid metal carbide and a nitrogen-containing material into a plasma;
   heating the solid metal carbide and nitrogen-containing material by the plasma to form ultrafine particles of the metal carbide; and
   collecting the ultrafine metal carbide particles.

2. The method of claim 1, wherein the nitrogen-containing material is provided in the form of a nitrogen compound.

3. The method of claim 2, wherein the nitrogen-containing material comprises urea, ureaform, urazole, ammonium acetate, N-N-dimethylformamide, methylformamide, methylhydrazine, formamide, ethylenediamine, methylamine and/or ammonia.

4. The method of claim 1, wherein the nitrogen-containing material is solid.

5. The method of claim 4, wherein the solid nitrogen-containing material comprise urea.

6. The method of claim 4, wherein the solid nitrogen-containing material has an average particle size of from 10 micron to 1,000 microns.

7. The method of claim 1, wherein the solid metal carbide comprises boron carbide.

8. The method of claim 1, further comprising mixing the solid metal carbide and nitrogen-containing material before the introduction into the plasma.

9. The method of claim 1, further comprising contacting the solid metal carbide and nitrogen-containing material with a carrier gas before the introduction into the plasma.

10. The method of claim 1, further comprising introducing an additional reactant into the plasma.

11. The method of claim 10, wherein the additional reactant comprises a metal of the metal carbide.

12. The method of claim 11, wherein the metal is boron.

13. The method of claim 10, wherein the additional reactant comprises silicon.

14. The method of claim 13, wherein the silicon is introduced into the plasma in the form of SiC.

15. The method of claim 1, wherein the ultrafine metal carbide particles have an average particle size of less than 100 nm.

16. The method of claim 1, wherein the ultrafine metal carbide particles comprise $B_4C$, $B_{13}C_2$, $B_8C$, $B_{10}C$ and/or $B_{25}C$.

17. The method of claim 1, wherein the ultrafine boron carbide particles comprise $B_4C$.

18. The method of claim 17, wherein the ultrafine $B_4C$ particles include less than 5 weight percent oxide impurities.

19. An apparatus for making ultrafine metal carbide particles comprising:
   a source of solid metal carbide;
   a source of nitrogen-containing material;
   a plasma chamber; and
   at least one feed line for delivering the solid metal carbide and nitrogen-containing material to the plasma chamber.

20. The apparatus of claim 19, wherein the nitrogen-containing material is solid.

21. The apparatus of claim 19, further comprising at least one carrier gas feed line for delivering a carrier gas to the plasma chamber.

22. The apparatus of claim 19, further comprising means for collecting the ultrafine metal carbide particles.

* * * * *